US012587242B2

(12) United States Patent
Payami et al.

(10) Patent No.: US 12,587,242 B2
(45) Date of Patent: Mar. 24, 2026

(54) CREATING CHANNELS FOR NETWORK TESTING USING CENTROIDS

(71) Applicant: VIAVI Solutions Inc., Chandler, AZ (US)

(72) Inventors: Sohail Payami, Essex (GB); Ata Sattarzadeh Hashemi, Guildford (GB); Chi-ming Leung, Hardwick (GB); Stephen Wang, London (GB); Zunaira Babar, Hitchin (GB)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 18/824,623

(22) Filed: Sep. 4, 2024

(65) Prior Publication Data

US 2026/0066957 A1       Mar. 5, 2026

(51) Int. Cl.
H04B 7/0452       (2017.01)
H04B 17/336       (2015.01)
H04W 24/06       (2009.01)
(52) U.S. Cl.
CPC ......... H04B 7/0452 (2013.01); H04B 17/336 (2015.01); H04W 24/06 (2013.01)
(58) Field of Classification Search
CPC .... H04B 7/0452; H04B 17/336; H04W 24/06
See application file for complete search history.

(56) References Cited

U.S. PATENT DOCUMENTS

| | | | |
|---|---|---|---|
| 10,128,967 B2 * | 11/2018 | Kyosti | .................... H04L 23/00 |
| 2013/0093628 A1 * | 4/2013 | Jones | ......................... G01S 5/14 |
| | | | 342/450 |
| 2019/0074913 A1 | 3/2019 | Liang et al. | |
| 2019/0115989 A1 | 4/2019 | Rodriguez-Herrera et al. | |
| 2022/0225269 A1 * | 7/2022 | Lai | ..................... H04W 64/006 |

FOREIGN PATENT DOCUMENTS

WO        2024132092 A1       6/2024

OTHER PUBLICATIONS

Extended European Search Report for Application No. EP251921961, mailed Jan. 26, 2026, 7 Pages.

* cited by examiner

*Primary Examiner* — Vineeta S Panwalkar
(74) *Attorney, Agent, or Firm* — Harrity & Harrity, LLP

(57)       ABSTRACT
In some implementations, a network test device may generate a set of candidate points in a spatial frequency domain. The network test device may select, from the set of candidate points, an initial set of points in the spatial frequency domain that maximizes a minimum distance between pairs of points in the set of candidate points. The network test device may evaluate a metric for each point in the initial set of points. The network test device may adjust locations of one or more points in the initial set of points based on metrics associated with the one or more points, to obtain a final set of points in the spatial frequency domain. The network test device may create one or more channels based on the final set of points. The network test device may use the one or more channels to test a system in a simulation environment.

20 Claims, 8 Drawing Sheets

800

810 ～ Generate, using a network test device, a set of candidate points in a spatial frequency domain, wherein a point in the set of candidate points represents a centroid associated with a user equipment (UE)

820 ～ Select, using the network test device and from the set of candidate points, an initial set of points in the spatial frequency domain that maximizes a minimum distance between pairs of points in the set of candidate points 830 ～ Evaluate, using the network test device, a metric for each point in the initial set of points 840 ～ Adjust, using the network test device, locations of one or more points in the initial set of points based on metrics associated with the one or more points, to obtain a final set of points in the spatial frequency domain 850 ～ Create, using the network test device, one or more multiple-input multiple-output (MIMO) channels based on the final set of points 860 ～ Use, by the network test device, the one or more MIMO channels to test a multiple user MIMO (MU-MIMO) system in a simulation environment

100

500

600

Network Test Device 602

Network 606

Network Node 604

800

810 — Generate, using a network test device, a set of candidate points in a spatial frequency domain, wherein a point in the set of candidate points represents a centroid associated with a user equipment (UE)

820 — Select, using the network test device and from the set of candidate points, an initial set of points in the spatial frequency domain that maximizes a minimum distance between pairs of points in the set of candidate points 830 — Evaluate, using the network test device, a metric for each point in the initial set of points 840 — Adjust, using the network test device, locations of one or more points in the initial set of points based on metrics associated with the one or more points, to obtain a final set of points in the spatial frequency domain 850 — Create, using the network test device, one or more multiple-input multiple-output (MIMO) channels based on the final set of points 860 — Use, by the network test device, the one or more MIMO channels to test a multiple user MIMO (MU-MIMO) system in a simulation environment

FIG. 8

CREATING CHANNELS FOR NETWORK TESTING USING CENTROIDS

BACKGROUND

A network test device may be used by network equipment manufacturers for function, system integration, capacity, and stress testing and emulation of a plurality of mobile devices, across multiple cells, to set up and test network nodes. A network node may be associated with a multi-user multiple-input multiple-output (MU-MIMO) system, which may be a Fourth Generation (4G) system, a Fifth Generation (5G) system, a Sixth Generation (6G) system, and so on. A network test device may deliver voice, data, realistic mobility models, and radio access network and/or physical layer side emulation, thereby providing a comprehensive validation solution. A network test device may ensure that users in a network are obtaining adequate quality of service. A network test device may ensure that the network is satisfying latency and round-trip-time requirements for voice- and time-critical applications.

SUMMARY

In some implementations, a method includes generating, using a network test device, a set of candidate points in a spatial frequency domain, wherein a point in the set of candidate points represents a centroid associated with a user equipment (UE); selecting, using the network test device and from the set of candidate points, an initial set of points in the spatial frequency domain that maximizes a minimum distance between pairs of points in the set of candidate points; evaluating, using the network test device, a metric for each point in the initial set of points; adjusting, using the network test device, locations of one or more points in the initial set of points based on metrics associated with the one or more points, to obtain a final set of points in the spatial frequency domain; creating, using the network test device, one or more multiple-input multiple-output (MIMO) channels based on the final set of points; and using, by the network test device, the one or more MIMO channels to test a multiple user MIMO (MU-MIMO) system in a simulation environment.

In some implementations, a network test device includes one or more components configured to: generate a set of candidate points in a spatial frequency domain, wherein a point in the set of candidate points represents a centroid associated with a UE; select, from the set of candidate points, an initial set of points in the spatial frequency domain that maximizes a minimum distance between pairs of points in the set of candidate points; evaluate a metric for each point in the initial set of points; adjust locations of one or more points in the initial set of points based on metrics associated with the one or more points, to obtain a final set of points in the spatial frequency domain; create one or more MIMO channels based on the final set of points; and use the one or more MIMO channels to test a MU-MIMO system in a simulation environment.

In some implementations, a non-transitory computer-readable medium storing a set of instructions includes one or more instructions that, when executed by one or more processors of a network test device, cause the network test device to: generate a set of candidate points in a spatial frequency domain, wherein a point in the set of candidate points represents a centroid associated with a UE; select, from the set of candidate points, an initial set of points in the spatial frequency domain that maximizes a minimum distance between pairs of points in the set of candidate points; evaluate a metric for each point in the initial set of points; adjust locations of one or more points in the initial set of points based on metrics associated with the one or more points, to obtain a final set of points in the spatial frequency domain; create one or more MIMO channels based on the final set of points; and use the one or more MIMO channels to test a MU-MIMO system in a simulation environment.

BRIEF DESCRIPTION OF THE DRAWINGS

FIG. 8 is a flowchart of an example process relating to creating channels for network testing using centroids.

DETAILED DESCRIPTION

Figure 1:
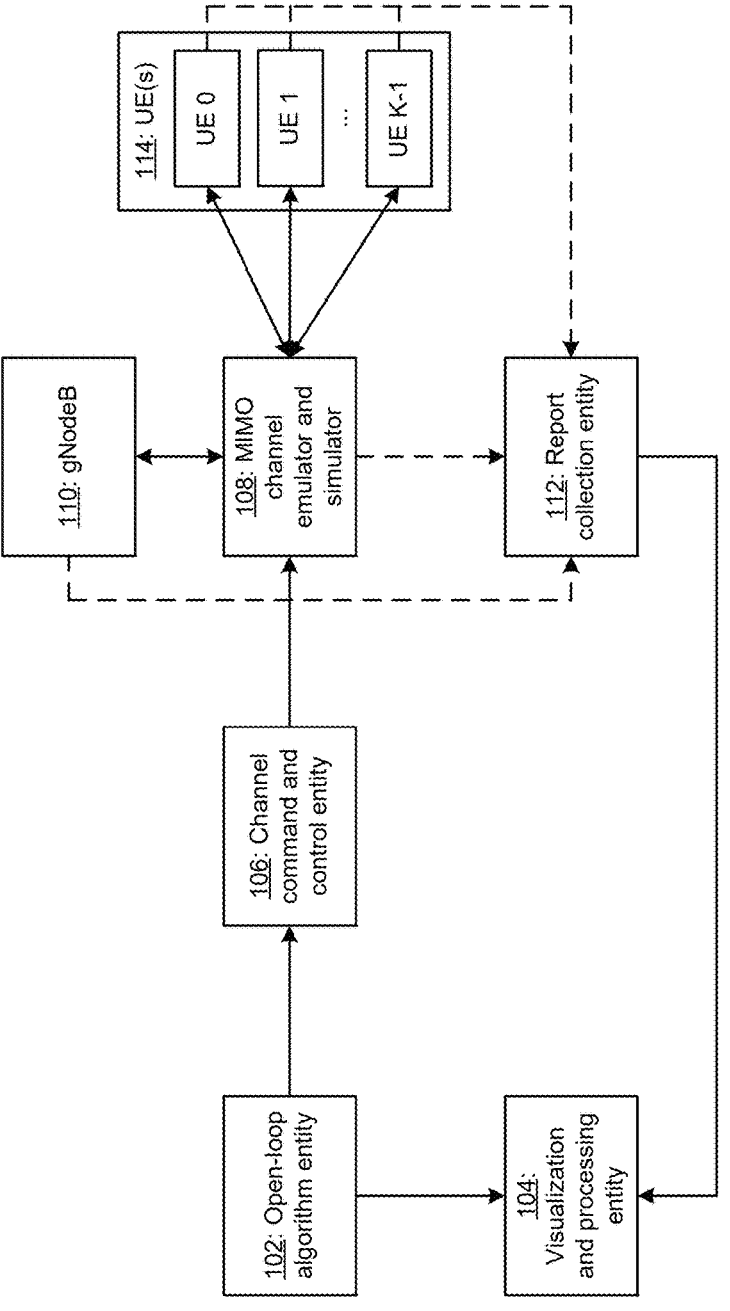
FIG. 1 is a diagram of an example associated with a MU-MIMO system in an open-loop test system.

The following detailed description of example implementations refers to the accompanying drawings. The same reference numbers in different drawings may identify the same or similar elements.

A network test device may be used by network equipment manufacturers for function, system integration, capacity, and stress testing and emulation of a plurality of mobile devices, across multiple cells, to set up and test network nodes. The network test device may deliver voice, data, realistic mobility models, and radio access network and/or physical layer side emulation, thereby providing a comprehensive validation solution.

In a wireless communication system, such as a MU-MIMO system, radio propagation channels may heavily impact system performance metrics, such as signal to interference plus noise ratio (SINR), throughput, and/or block error rate (BLER). By using the network test device, specific channel conditions may be created to evaluate or test the MU-MIMO system. For example, to test whether the MU-MIMO system is able to achieve a maximum throughput, propagation channels may be ensured to allow such data rates. Designing such propagation channels may be a non-trivial, computationally heavy, and/or time consuming task. During the test of the MU-MIMO system, UEs may be placed at optimal angles to create propagation channels which allow for such throughputs. Identifying the optimal angles for the UEs may be a mathematically complex task due to several sources of error and noise, such as calibration error and performance drift due to temperature. An adaptation to system changes by the UEs and/or gNodeBs may add additional complexity when identifying the optimal angles for the UEs. Blindly adjusting UE positions to optimize the throughput may be a tedious and time consuming task. Thus, when testing the MU-MIMO system using existing techniques, an overall system performance of the network test device may be degraded.

In some implementations, in a MU-MIMO system in an open-loop test system, a network test device may use an open-loop centroid based approach for creating MIMO channels with reduced inter-UE interference. The loop centroid based approach may operate independently of information about a gNodeB, such as beam information, or the choice of UE equalizer. Directional channels may be created in the MU-MIMO system in the open-loop test system, which may be useful for a broad set of applications, such as for testing MU-MIMO systems. In a geometry-based model, a channel may be characterized by an antenna array geometry and angles on which UE antennas are placed. Each UE may be modeled by a centroid in a spatial frequency domain. The spatial frequency domain may be used to set directions between each antenna of the UE and a gNodeB. A circular distance between centroids/UEs may be maximized in the spatial frequency domain. Circular and Euclidian distances between angle locations may be maximized in a discrete Fourier transform (DFT) domain. The circular distance (or a different metric to define distance) may be maximized between the centroids. Angles for each UE's antennas may be placed around its centroid. In other words, after the circular distance between different UEs is maximized, the UE's antennas may be placed on directions, such as around the centroid in the spatial frequency domain. A distance to the centroid and a shape of a simplex around the centroid may be optimized so that the UE equalizer is able to effectively correct any distortions. In some implementations, by modeling each UE as the centroid, inter-UE interference may be reduced, thereby improving an overall system performance.

FIG. 1 is a diagram of an example 100 associated with a MU-MIMO system in an open-loop test system.

As shown in FIG. 1, in the MU-MIMO system in the open-loop test system, an open-loop algorithm entity 102 may propose initial UE channels or locations, which may result in a relatively favorable performance. A visualization and processing entity 104 may visualize or further process such locations and other parameters and reports. The open-loop algorithm entity 102 may indicate the initial UE channels or locations to a channel command control entity 106, which may provide the initial UE channels or locations to a MIMO channel emulator and simulator 108. Performance metrics (e.g., a performance/measurement report) by a gNodeB 110 and UE(s) 114 may be sent to a report collection entity 112. The report collection entity 112 may be in connection with other entities in the MU-MIMO system in the open-loop test system, such as the visualization and processing entity 104.

As indicated above, FIG. 1 is provided as an example. Other examples may differ from what is described with regard to FIG. 1.

Regarding an antenna factor and spatial frequency, a downlink scenario may involve K users, where each user has M antennas, and a gNodeB has N antennas. A gNodeB antenna array may be dual polarized and placed on an x-z plane. A transmission on one polarization may be repeated for the other polarization. In each polarization, an array may be a rectangular array with $N_x$ antennas with spacing $d_x$ and $N_z$ antennas with $d_z$ on the horizontal and vertical domains. An array response for a received signal $y_{n_x,n_z}(\phi, \theta, t)=y_{0,0}(\phi, \theta, t) a_{n_x,n_z}(\phi, \theta)$ at position $(n_x, n_z)$ in a two-dimensional (2D) array may be represented by:

$$a_{n_x,n_z}(\phi, \theta) = e^{j2\pi/\lambda(n_x d_x \sin(\theta)\sin(\phi)+n_z d_z \cos(\theta))},$$

where $n_x \in \{0, N_x-1\}$, $n_z \in \{0, N_z-1\}$, t represents a time (t can be dropped for the sake of simplicity of notation), $\lambda$ is a wavelength, and $\theta$ and $\phi$ are an elevation angle (angle from a z-axis) and an azimuth angle (angle from an x-axis in the yz-plane), respectively. A relationship between phase values on a phase shifter matrix and UE locations may also be in accordance with the array response.

Signals can be represented by an array response matrix $A(\phi, \theta)$ where it's elements is generated using $a_{n_x,n_z}(\phi, \theta)$. Instead of using the elevation and azimuth angles, UE locations may be represented using spatial frequency and in a DFT domain. However, other transforms that capture a linear progressive phase effect over the array may be used. Using spatial frequency in antenna array processing may introduce linearity in the manner in which the array's response to signals from different directions is represented and analyzed. Such linearity may arise from a relationship between an array geometry, signal arrival angles, and Fourier transform properties.

Spatial frequencies may be defined as $\omega_x=2\pi f_x/N_x$ and $\omega_z=2\pi f_z/N_z$, where normalized spatial frequencies $f_x$ and $f_y$ are continuous and periodic with periodicities $N_x$ and $N_z$, respectively. For the x-axis, $$f_x \in \left[-\frac{N_x}{2}, \frac{N_x}{2}\right]$$

may be assumed, and the notation for the y-axis may be similar. A spatial frequency response of the array is defined by:

$$B(f_x, f_z) = \sum_{n_x=0}^{N_x-1}\sum_{n_z=0}^{N_z-1} a_{n_x,n_z}(\phi, \theta)e^{-j2\pi(n_x f_x/N_x + n_z f_z/N_z)},$$

which may be used for any array excitation and beam parameters $a_{n_x,n_z}$.

Regarding Euclidean distances versus circular distances, in a two-dimensional space, two points $a=(x_1, y_1)$ and $b=(x_2, y_2)$ on a grid may be considered with boundaries $[-N, N]$ for an x-axis and $[-M, M]$ for a y-axis. Due to a periodic behavior of a spatial frequency, a circular distance may be used instead of a Euclidean distance. The Euclidean distance may be a direct distance between two points in a straight line. The Euclidean distance may always be a shortest distance between the two points when there are no grid boundaries to consider. The Euclidean distance may be defined as:

$$D_E(a, b) = \sqrt{|x_2 - x_1|^2 + |y_2 - y_1|^2}.$$

On the other hand, the circular distance may consider a possibility of wrapping around the boundaries of the grid. In effect, the circular distance may sometimes provide a shorter path by wrapping around the edges. The circular distance may be either equal to or shorter than the Euclidean distance, depending on positions of points and dimensions of a grid. The circular distance may be defined as:

$$\begin{cases} D_x = \min(|x_2 - x_1|, N_x - |x_2 - x_1|) \\ D_y = \min(|y_2 - y_1|, N_y - |y_2 - y_1|) \\ D_C(a, b) = \sqrt{D_x^2 + D_y^2} \end{cases}.$$

Figure 2:
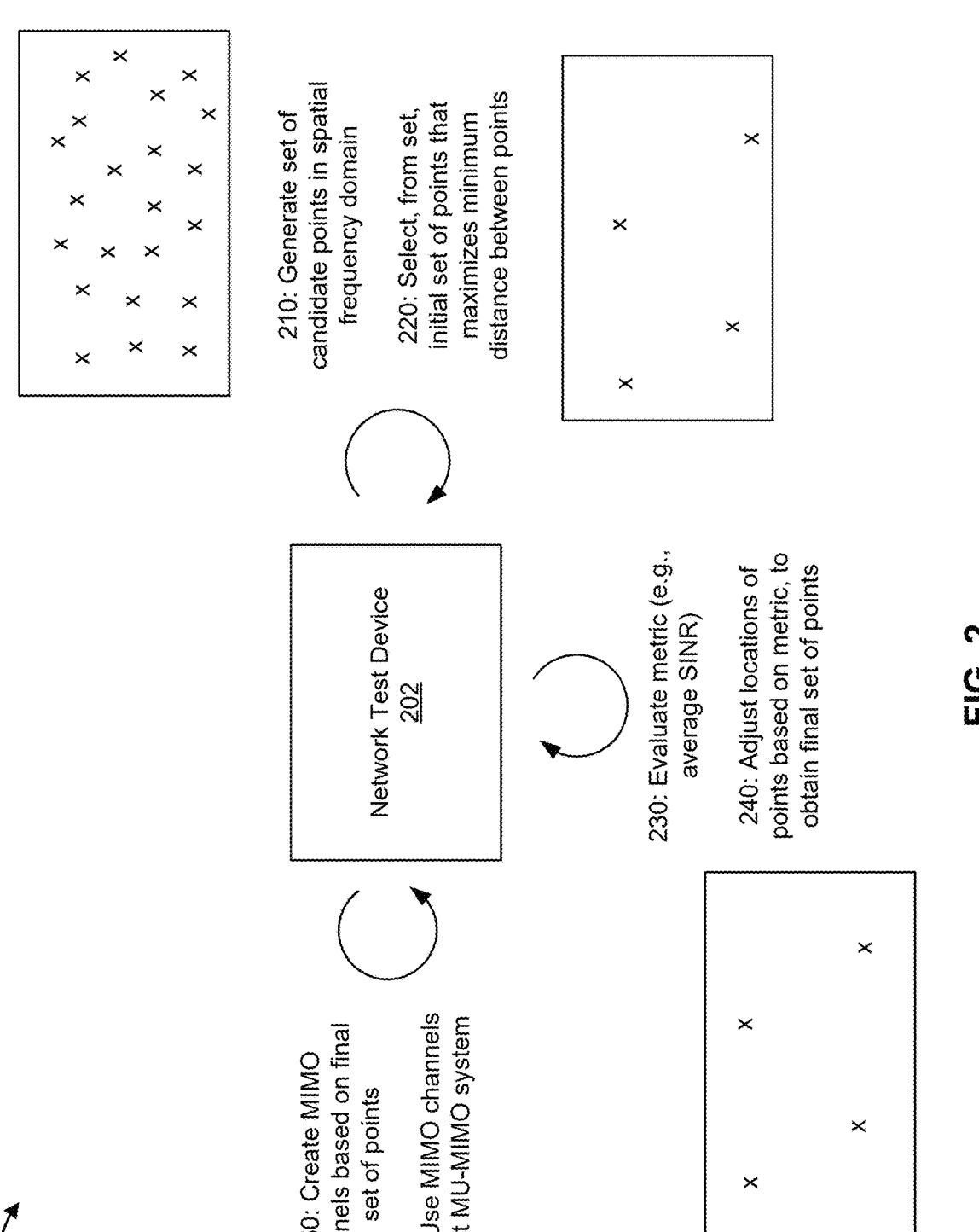
FIG. 2 is a diagram of an example associated with creating channels for network testing using centroids.

FIG. 2 is a diagram of an example 200 associated with creating channels for network testing using centroids. The example 200 includes a network test device 202.

As shown by reference number 210, the network test device 202 may generate a set of candidate points in a spatial frequency domain. A point in the set of candidate points may represent a centroid associated with a UE. The centroid may be a center point associated with the UE, where the centroid may be represented in the spatial frequency domain. The network test device 202 may generate the set of candidate points in a first step of a two-step algorithm.

As shown by reference number 220, the network test device 202 may select, from the set of candidate points, an initial set of points in the spatial frequency domain that maximizes a minimum distance between pairs of points in the set of candidate points. The network test device 202 may select the initial set of points in the first step of the two-step algorithm. The network test device 202 may compute distances between the pairs of points in the set of candidate points. The initial set of points may be based on the distances between the pairs of points. The minimum distance may be a circular distance. The network test device 202 may maximize the minimum distance between the pairs of points in the set of candidate points to reduce inter-UE interference.

As shown by reference number 230, the network test device 202 may evaluate a metric for each point in the initial set of points. The metric may be an average SINR. Alternatively, the network test device 202 may evaluate another type of metric, such as a minimum SINR or a channel condition number. The network test device 202 may evaluate the metric in a second step of the two-step algorithm.

As shown by reference number 240, the network test device 202 may adjust locations of one or more points in the initial set of points based on metrics associated with the one or more points, to obtain a final set of points in the spatial frequency domain. The network test device 202 may adjust the locations, to obtain the final set of points, in the second step of the two-step algorithm.

In some implementations, the network test device 202 may use an open-loop centroid based approach for creating MIMO channels, which may not exploit gNodeB beam information. The open-loop centroid based approach may be based at least in part on the two-step algorithm. The network test device 202 may use the two-step algorithm to find an optimal initial set of coordinates for points within a defined 2D region, such that a minimum distance between any two points is maximized, where such an optimization may help ensure that points are relatively well spaced. The points may be associated with UE locations. The first step of the two-step algorithm may involve an initial placement. As part of the initial placement, the network test device 202 may generate candidate locations. The network test device 202 may generate a set of potential initial coordinates within the defined 2D region. Potential initial coordinates may correspond to initial UE locations. The network test device 202 may calculate distances. The network test device 202 may compute the distance between each pair of candidate points. The network test device 202 may select an initial set. The network test device 202 may select an initial set of points that maximizes a minimum distance between any two points. The second step of the two-step algorithm may involve an iterative optimization. As part of the iterative optimization, the network test device 202 may evaluate a performance. For each selected point, the network test device 202 may evaluate performance criteria (e.g., average SINR). The network test device 202 may adjust locations. The network test device 202 may iteratively adjust the points' positions to further improve spacing and performance, which may ensure that the points remain within the defined 2D region. The network test device 202 may finalize coordinates. The network test device 202 may finalize the coordinates when no further improvement in spacing or performance can be achieved. The network test device 202 may utilize the two-step algorithm to ensure that the points are optimally spaced within the defined 2D region, providing a good initial setup for further optimizations.

In some implementations, during the first step of the two-step algorithm, the network test device 202 may maximize the minimum distance between the centroid of the UE in a DFT domain to minimize inter-UE interference. The network test device 202 may model each multiantenna UE k by its centroid spatial frequency, which may be defined by $F_k=(F_{x,k}, F_{y,k})$, where $$F_{x,k} = \frac{1}{L}\sum f_{x,k,l} \text{ and } F_{x,k} = \frac{1}{L}\sum f_{y,k,l},$$

and $f_{x,i,l}$ and $f_{y,i,l}$ are the horizontal and vertical spatial frequencies corresponding to an l-th layer of user k, respectively. Further, $$F = \{F_0, \ldots, F_{K-1}\} \text{ and}$$

$$\Delta(F) = \min_{k \neq k'} D_C(F_k, F'_k), \forall\, k.$$

A design criteria may be to maximize $\Delta(F)$, where:

$$\text{s.t. } F_{x,k} \in \left[-\frac{N_x}{2}, \frac{N_x}{2}\right], F_{y,k} \in \left[-\frac{N_y}{2}, \frac{N_y}{2}\right], k \in \{0, K-1\}.$$

In some implementations, to solve this optimization problem, the network test device 202 may utilize an algorithm for maximizing a minimum distance. An input to the algorithm may be $N_x$, $N_y$, K, numIter, tolerance, and an output of the algorithm may be $F^{opt}$, $\delta_C^{opt}$. The network test device 202, when running the algorithm, may initialize $\delta_C^{init}=-1$, $t=\infty$. For i=1:numIter, the network test device 202 may generate F such that $$F_{x,k} = -\frac{N_x}{2} + 2N_x U(0, 1) \text{ and } F_{y,k} = -\frac{N_y}{2} + 2N_y U(0, 1).$$

When $$\delta_C^{optinit} < \Delta(F), \delta_C^{init} = \Delta(F) \text{ and } F^{init} = F.$$

While $$\text{tolerance} < t, [F^{opt}, \delta_c^{opt}] = \Psi\{\Delta(F^{init})\},$$

where $\Psi\{\Delta\}$ may represent applying an optimization method, such as a Nelder Mead or Hooke-Jeeves pattern search, to find the local or global optima of $\Delta$. The network test device 202 may update $F^{opt}$ by considering a circular wrap around effect when any elements of $F^{opt}$ are outside grid boundaries. Further, $t=|\delta^{opt}-\delta^{init}|$ and $$F^{init} = F^{opt} \text{ and } \delta_c^{init} = \delta_c^{opt}.$$

$U(0,1)$ may represent a uniform random variable between 0 and 1.

In some implementations, during the second step of the two-step algorithm, after centroids are calculated, the network test device 202 may place each UE's angles (or antennas) around its centroid. A shape and distance of these angles may depend on a performance of gNodeB beams, an array structure, a UE equalizer, and/or an intra-UE interference among its layers. The network test device 202 may separate UE angles in a vertical domain, which may be due to the gNodeB offering more directional beams in the vertical domain due to its larger antenna spacing as compared to a horizontal domain. L and r may denote a number of layers per polarization for a given UE, and a distance of an lth layer to a centroid $F_k$, respectively. The network test device 202 may place the UE angles around its centroid according to:

$$\begin{cases} f_{y,k,l} = F_{y,k} + imag\{p_0\} \\ f_{x,k,l} = F_{x,k} + real\{p_0\} \end{cases},$$

where $p_0$ is defined by:

$$p_0 = r \, \exp\left(\frac{\pi}{L} + \frac{2\pi l}{L}\right), \, l \in \{0, \ldots, L-1\}.$$

In some implementations, in the two-step algorithm, a number transmit layers (or transmission layers) may be assumed to be an even number, but a generalization to odd numbers may be straightforward.

As shown by reference number 250, the network test device 202 may create one or more MIMO channels based on the final set of points. The network test device 202 may create the one or more MIMO channels without using network node information (e.g., base station information) that includes beam information. The network test device 202 may create the one or more MIMO channels without using UE equalizer information. The network test device 202 may create the one or more MIMO channels based on a number of UEs, a polarization, and a number of layers per polarization for a given UE. The network test device 202 may create multiple MIMO channels for multiple UEs, where each UE of the multiple UEs may be associated with a certain number of layers per polarization.

As shown by reference number 260, the network test device 202 may use the one or more MIMO channels to test a MU-MIMO system in a simulation environment. The network test device 202, using the one or more MIMO channels, may evaluate whether the MU-MIMO system is able to achieve a maximum throughput. The network test device 202 may create such directional channels within the simulation environment, where the directional channels may be evaluated in terms of system performance metrics, such as SINR, throughput, and/or BLER. In some implementations, the network test device 202 may place, within the simulation environment, one or more antennas associated with the UE in directions surrounding the centroid in the spatial frequency domain. The one or more antennas may be placed in accordance with an array structure associated with the one or more antennas.

As indicated above, FIG. 2 is provided as an example. Other examples may differ from what is described with regard to FIG. 2.

Figure 3:
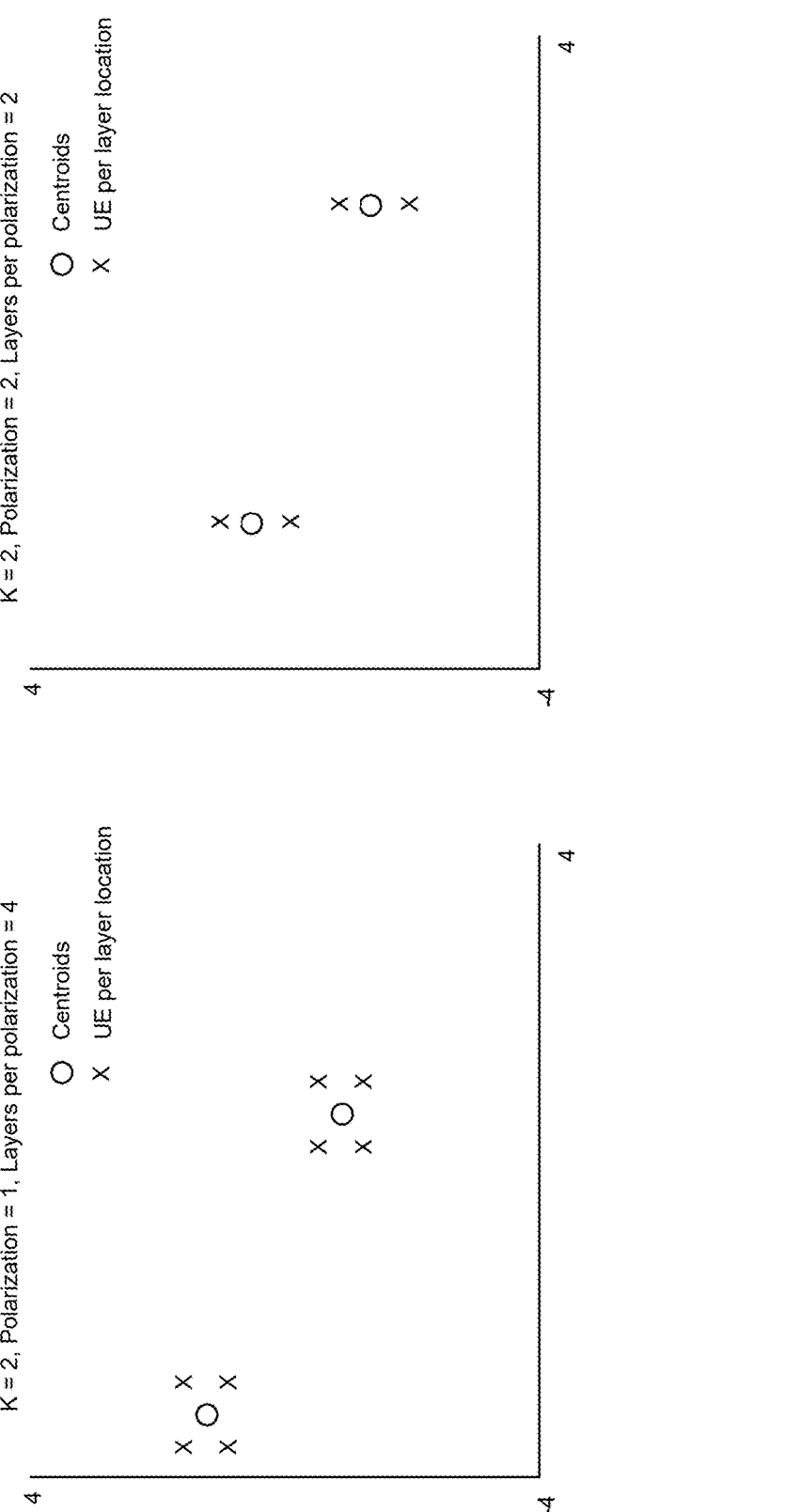
FIG. 3 is a diagram of an example associated with algorithm outputs.

FIG. 3 is a diagram of an example 300 associated with algorithm outputs.

In some implementations, an algorithm output may consider different combinations of a number of UEs (K), transit layers, and polarization. As shown by reference number 302, K=2, polarization=1, and layers per polarization=4. As shown, each of the two centroids (2 UEs) may be associated with four layers per polarization (UE per layer location). As shown by reference number 304, K=2, polarization=2, and layers per polarization=2. As shown, each of the two centroids (2 UEs) may be associated with two layers per polarization (UE per layer location).

As indicated above, FIG. 3 is provided as an example. Other examples may differ from what is described with regard to FIG. 3.

Figure 4:
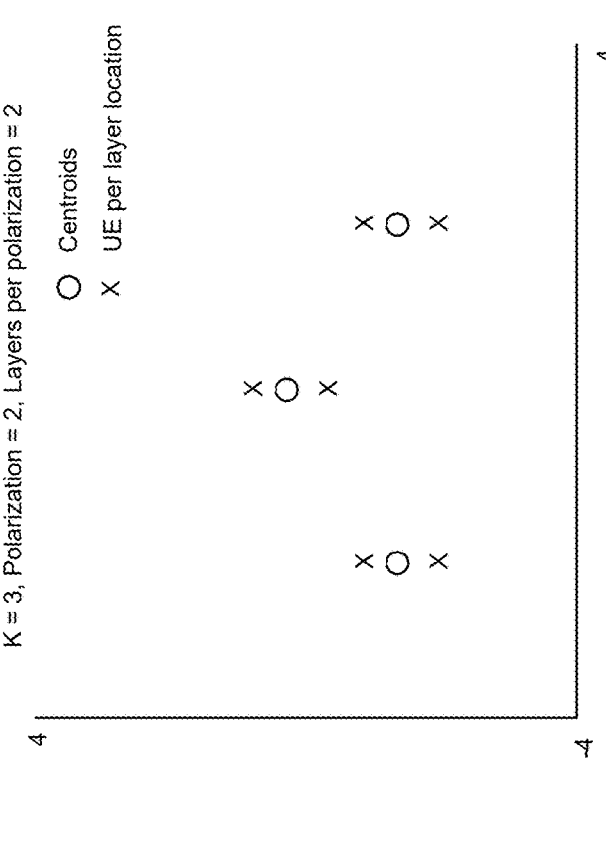
FIG. 4 is a diagram of an example associated with algorithm outputs.

FIG. 4 is a diagram of an example 400 associated with algorithm outputs.

In some implementations, an algorithm output may consider different combinations of a number of UEs (K), transit layers, and polarization. As shown by reference number 502, K=2, polarization=1, and layers per polarization=4. As shown, each of the four centroids (4 UEs) may be associated with four layers per polarization (UE per layer location). As shown by reference number 504, K=3, polarization=2, and layers per polarization=2. As shown, each of the three centroids (3 UEs) may be associated with two layers per polarization (UE per layer location).

As indicated above, FIG. 4 is provided as an example. Other examples may differ from what is described with regard to FIG. 4.

Figure 5:
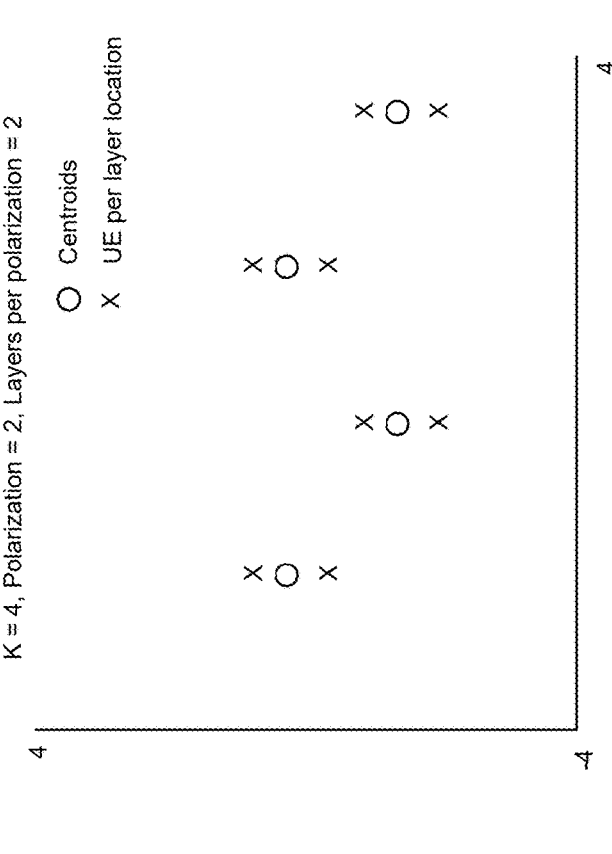
FIG. 5 is a diagram of an example associated with algorithm outputs.
Figure 5:
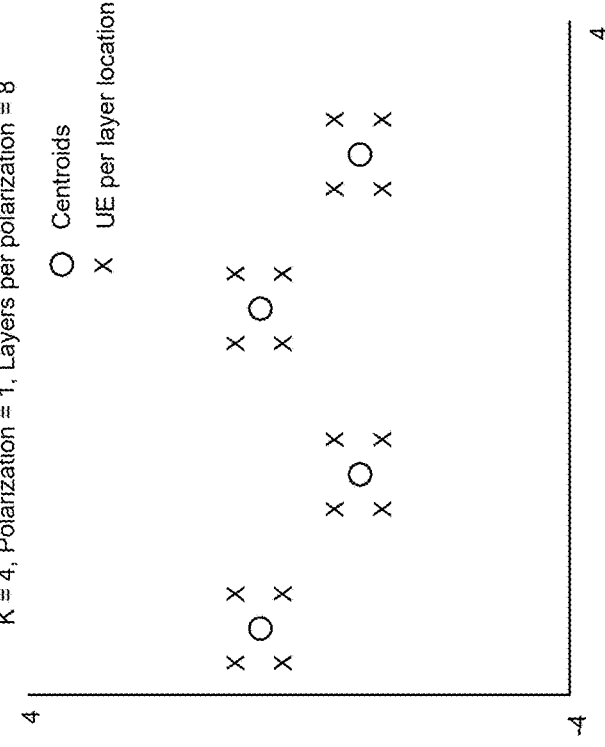

FIG. 5 is a diagram of an example 500 associated with algorithm outputs.

In some implementations, an algorithm output may consider different combinations of a number of UEs (K), transit layers, and polarization. As shown by reference number 502, K=4, polarization=1, and layers per polarization=8. As shown, each of the four centroids (4 UEs) may be associated with eight layers per polarization (UE per layer location). As shown by reference number 504, K=4, polarization=2, and layers per polarization=2. As shown, each of the four centroids (4 UEs) may be associated with two layers per polarization (UE per layer location).

As indicated above, FIG. 5 is provided as an example. Other examples may differ from what is described with regard to FIG. 5.

Figure 6:
FIG. 6 is a diagram of an example environment in which systems and/or methods described herein may be implemented.

FIG. 6 is a diagram of an example environment 600 in which systems and/or methods described herein may be implemented. As shown in FIG. 6, environment 600 may include a network test device 602, a network node 604, and a network 606. Devices of environment 600 may interconnect via wired connections, wireless connections, or a combination of wired and wireless connections.

The network test device 602 may include one or more devices capable of receiving, processing, storing, routing, and/or providing information associated with calibrating amplitude and phase of a transceiver array in a network test device, as described elsewhere herein. The network test device 602 may include a computing device. The network test device 602 may be used by network equipment manufacturers for function, system integration, capacity, and stress testing and emulation of a plurality of mobile devices, across multiple cells, to set up and test network nodes. The network test device 602 may deliver voice, data, realistic mobility models, and 4G/5G core emulation, thereby providing a comprehensive validation solution. The network test device 602 may ensure that users in a network are obtaining adequate quality of service. The network test device 602 may ensure that the network is satisfying latency and round-trip time requirements for voice and time-critical applications.

The network node 604 may include one or more devices capable of receiving, processing, storing, routing, and/or providing information associated with calibrating amplitude and phase of a transceiver array in a network test device, as described elsewhere herein. The network node 604 may be an aggregated network node, meaning that the aggregated network node is configured to utilize a radio protocol stack that is physically or logically integrated within a single RAN node (e.g., within a single device or unit). The network node 604 may be a disaggregated network node (sometimes referred to as a disaggregated base station), meaning that the network node 604 is configured to utilize a protocol stack that is physically or logically distributed among two or more nodes (such as one or more central units (CUs), one or more distributed units (DUs), or one or more radio units (RUS)). The network node 604 may include, for example, a New Radio (NR) base station, a long-term evolution (LTE) base station, a Node B, an eNB (e.g., in 4G), a gNodeB (e.g., in5G), an access point, a transmission reception point (TRP), a DU, an RU, a CU, a mobility element of a network, a core network node, a network element, a network equipment, and/or a radio access network (RAN) node.

The network 606 may include one or more wired and/or wireless networks. For example, the network 606 may include a cellular network (e.g., a 6G network, a 5G network, a 4G network, an LTE network, a Third Generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 606 may enable communication among the one or more devices of environment 600.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
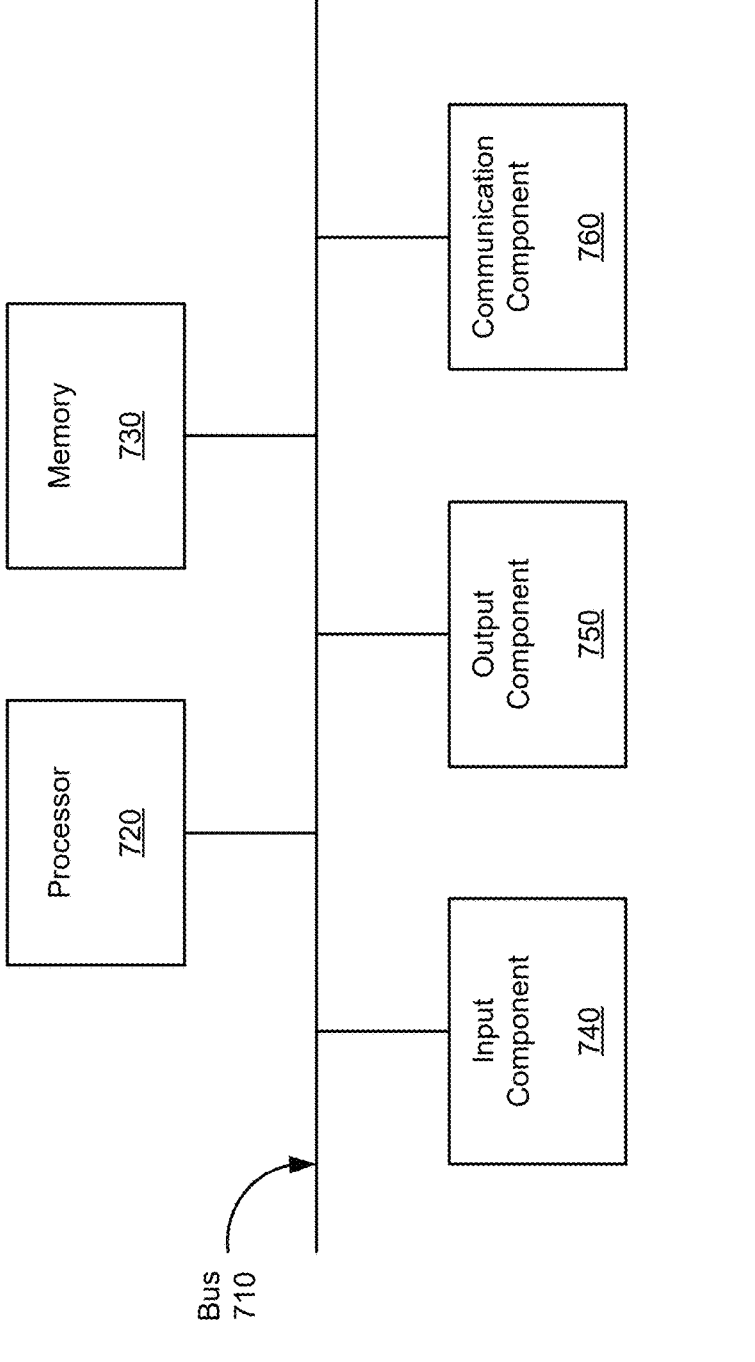
FIG. 7 is a diagram of example components of one or more devices of FIG. 6.

FIG. 7 is a diagram of example components of a device 700 associated with calibrating amplitude and phase of a transceiver array in a network test device. The device 700 may correspond to a network test device (e.g., network test device 202). In some implementations, the device may include one or more devices 700 and/or one or more components of the device 700. As shown in FIG. 7, the device 700 may include a bus 710, a processor 720, a memory 730, an input component 740, an output component 750, and/or a communication component 760.

The bus 710 may include one or more components that enable wired and/or wireless communication among the components of the device 700. The bus 710 may couple together two or more components of FIG. 7, such as via operative coupling, communicative coupling, electronic coupling, and/or electric coupling. For example, the bus 710 may include an electrical connection (e.g., a wire, a trace, and/or a lead) and/or a wireless bus. The processor 720 may include a central processing unit, a graphics processing unit, a microprocessor, a controller, a microcontroller, a digital signal processor, a field-programmable gate array, an application-specific integrated circuit, and/or another type of processing component. The processor 720 may be implemented in hardware, firmware, or a combination of hardware and software. In some implementations, the processor 720 may include one or more processors capable of being programmed to perform one or more operations or processes described elsewhere herein.

The memory 730 may include volatile and/or nonvolatile memory. For example, the memory 730 may include random access memory (RAM), read only memory (ROM), a hard disk drive, and/or another type of memory (e.g., a flash memory, a magnetic memory, and/or an optical memory). The memory 730 may include internal memory (e.g., RAM, ROM, or a hard disk drive) and/or removable memory (e.g., removable via a universal serial bus connection). The memory 730 may be a non-transitory computer-readable medium. The memory 730 may store information, one or more instructions, and/or software (e.g., one or more software applications) related to the operation of the device 700. In some implementations, the memory 730 may include one or more memories that are coupled (e.g., communicatively coupled) to one or more processors (e.g., processor 720), such as via the bus 710. Communicative coupling between a processor 720 and a memory 730 may enable the processor 720 to read and/or process information stored in the memory 730 and/or to store information in the memory 730.

The input component 740 may enable the device 700 to receive input, such as user input and/or sensed input. For example, the input component 740 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 750 may enable the device 700 to provide output, such as via a display, a speaker, and/or a light-emitting diode. The communication component 760 may enable the device 700 to communicate with other devices via a wired connection and/or a wireless connection. For example, the communication component 760 may include a receiver, a transmitter, a transceiver, a modem, a network interface card, and/or an antenna.

The device 700 may perform one or more operations or processes described herein. For example, a non-transitory computer-readable medium (e.g., memory 730) may store a set of instructions (e.g., one or more instructions or code) for execution by the processor 720. The processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hardwired circuitry may be used instead of or in combination with the instructions to perform one or more operations or processes described herein. Additionally, or alternatively, the processor 720 may be configured to perform one or more operations or processes described herein. Thus, implementations described herein are not limited to any specific combination of hardware circuitry and software.

The number and arrangement of components shown in FIG. 7 are provided as an example. The device 700 may include additional components, fewer components, different components, or differently arranged components than those shown in FIG. 7. Additionally, or alternatively, a set of components (e.g., one or more components) of the device 700 may perform one or more functions described as being performed by another set of components of the device 700.

FIG. 8 is a flowchart of an example process 800 associated with creating channels for network testing using centroids. In some implementations, one or more process blocks of FIG. 8 may be performed by a network test device (e.g., network test device 202). Additionally, or alternatively, one or more process blocks of FIG. 8 may be performed by one or more components of device 700, such as processor 720, memory 730, input component 740, output component 750, and/or communication component 760.

As shown in FIG. 8, process 800 may include generating, using the network test device, a set of candidate points in a spatial frequency domain, wherein a point in the set of candidate points represents a centroid associated with a UE (block 810). The centroid may be a center point associated with the UE, where the centroid may be represented in the spatial frequency domain.

As shown in FIG. 8, process 800 may include selecting, using the network test device and from the set of candidate points, an initial set of points in the spatial frequency domain that maximizes a minimum distance between pairs of points in the set of candidate points (block 820). The network test device may compute distances between the pairs of points in the set of candidate points. The initial set of points may be based on the distances between the pairs of points. The minimum distance may be a circular distance. The network test device may maximize the minimum distance between the pairs of points in the set of candidate points to reduce inter-UE interference.

As shown in FIG. 8, process 800 may include evaluating, using the network test device, a metric for each point in the initial set of points (block 830). The metric may be an average SINR.

As shown in FIG. 8, process 800 may include adjusting, using the network test device, locations of one or more points in the initial set of points based on metrics associated with the one or more points, to obtain a final set of points in the spatial frequency domain (block 840).

As shown in FIG. 8, process 800 may include creating, using the network test device, one or more MIMO channels based on the final set of points (block 850). The network test device may create the one or more MIMO channels without using network node information that includes beam information. The network test device may create the one or more MIMO channels without using UE equalizer information. The network test device may create the one or more MIMO channels based on a number of UEs, a polarization, and a number of layers per polarization for a given UE.

As shown in FIG. 8, process 800 may include using, by the network test device, the one or more MIMO channels to test a MU-MIMO system in a simulation environment (block 860). The network test device, using the one or more MIMO channels, may evaluate whether the MU-MIMO system is able to achieve a maximum throughput. The network test device may place, within the simulation environment, one or more antennas associated with the UE in directions surrounding the centroid in the spatial frequency domain. The one or more antennas may be placed in accordance with an array structure associated with the one or more antennas.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
generating, using a network test device, a set of candidate
points in a spatial frequency domain, wherein a point in
the set of candidate points represents a centroid asso-
ciated with a user equipment (UE);
selecting, using the network test device and from the set
of candidate points, an initial set of points in the spatial
frequency domain that maximizes a minimum distance
between pairs of points in the set of candidate points;
evaluating, using the network test device, a metric for
each point in the initial set of points;
adjusting, using the network test device, locations of one
or more points in the initial set of points based on
metrics associated with the one or more points, to
obtain a final set of points in the spatial frequency
domain;
creating, using the network test device, one or more
multiple-input multiple-output (MIMO) channels
based on the final set of points; and
using, by the network test device, the one or more MIMO
channels to test a multiple user MIMO (MU-MIMO)
system in a simulation environment.

2. The method of claim 1, further comprising:
computing, using the network test device, distances
between the pairs of points in the set of candidate
points, wherein the initial set of points is based on the
distances between the pairs of points.

3. The method of claim 1, wherein creating the one or more MIMO channels is without using network node infor-mation that includes beam information, and wherein the one or more MIMO channels are created without using UE equalizer information.

4. The method of claim 1, wherein the minimum distance is a circular distance.

5. The method of claim 1, wherein the metric is an average signal-to-interference-plus-noise ratio (SINR).

6. The method of claim 1, wherein maximizing the minimum distance between the pairs of points in the set of candidate points reduces inter-UE interference.

7. The method of claim 1, further comprising:
placing, using the network test device and within the
simulation environment, one or more antennas associ-
ated with the UE in directions surrounding the centroid
in the spatial frequency domain, wherein the one or
more antennas are placed in accordance with an array
structure associated with the one or more antennas.

8. The method of claim 1, wherein creating the one or more MIMO channels is based on a number of UEs, a polarization, and a number of layers per polarization for a given UE.

9. A network test device, comprising:
one or more components configured to:
generate a set of candidate points in a spatial frequency
domain, wherein a point in the set of candidate points
represents a centroid associated with a user equip-
ment (UE);
select, from the set of candidate points, an initial set of
points in the spatial frequency domain that maxi-
mizes a minimum distance between pairs of points in
the set of candidate points;
evaluate a metric for each point in the initial set of
points;
adjust locations of one or more points in the initial set
of points based on metrics associated with the one or
more points, to obtain a final set of points in the
spatial frequency domain;
create one or more multiple-input multiple-output
(MIMO) channels based on the final set of points;
and
use the one or more MIMO channels to test a multiple
user MIMO (MU-MIMO) system in a simulation
environment.

10. The network test device of claim 9, wherein the one or more components are further configured to:
compute distances between the pairs of points in the set of
candidate points, wherein the initial set of points is
based on the distances between the pairs of points.

11. The network test device of claim 9, wherein the one or more components are further configured to:
create the one or more MIMO channels without using
network node information that includes beam informa-
tion, and wherein the one or more MIMO channels are
created without using UE equalizer information; or
maximize the minimum distance between the pairs of
points in the set of candidate points reduces inter-UE
interference.

12. The network test device of claim 9, wherein:
the minimum distance is a circular distance; or
the metric is an average signal-to-interference-plus-noise
ratio (SINR).

13. The network test device of claim 9, wherein the one or more components are further configured to:
place, within the simulation environment, one or more
antennas associated with the UE in directions surround-
ing the centroid in the spatial frequency domain,
wherein the one or more antennas are placed in accor-
dance with an array structure associated with the one or
more antennas.

14. The network test device of claim 9, wherein the one or more components are configured to create the one or more MIMO channels based on a number of UEs, a polarization, and a number of layers per polarization for a given UE.

15. A non-transitory computer-readable medium storing a set of instructions, the set of instructions comprising:

one or more instructions that, when executed by one or more processors of a network test device, cause the network test device to:

generate a set of candidate points in a spatial frequency domain, wherein a point in the set of candidate points represents a centroid associated with a user equipment (UE);

select, from the set of candidate points, an initial set of points in the spatial frequency domain that maximizes a minimum distance between pairs of points in the set of candidate points;

evaluate a metric for each point in the initial set of points;

adjust locations of one or more points in the initial set of points based on metrics associated with the one or more points, to obtain a final set of points in the spatial frequency domain;

create one or more multiple-input multiple-output (MIMO) channels based on the final set of points; and use the one or more MIMO channels to test a multiple user MIMO (MU-MIMO) system in a simulation environment.

16. The non-transitory computer-readable medium of claim 15, wherein the one or more instructions, when executed by the one or more processors of the network test device, further cause the network test device to:

compute distances between the pairs of points in the set of candidate points, wherein the initial set of points is based on the distances between the pairs of points.

17. The non-transitory computer-readable medium of claim 15, wherein the one or more instructions, when executed by the one or more processors of the network test device, further cause the network test device to:

create the one or more MIMO channels without using network node information that includes beam information, and wherein the one or more MIMO channels are created without using UE equalizer information; or maximize the minimum distance between the pairs of points in the set of candidate points reduces inter-UE interference.

18. The non-transitory computer-readable medium of claim 15, wherein:

the minimum distance is a circular distance; or the metric is an average signal-to-interference-plus-noise ratio (SINR).

19. The non-transitory computer-readable medium of claim 15, wherein the one or more instructions, when executed by the one or more processors of the network test device, further cause the network test device to:

place, within the simulation environment, one or more antennas associated with the UE in directions surrounding the centroid in the spatial frequency domain, wherein the one or more antennas are placed in accordance with an array structure associated with the one or more antennas.

20. The non-transitory computer-readable medium of claim 15, wherein the one or more instructions, when executed by the one or more processors of the network test device, further cause the network test device to:

create the one or more MIMO channels based on a number of UEs, a polarization, and a number of layers per polarization for a given UE.

* * * * *